Nov. 19, 1957  F. H. HOLLMIG  2,813,941
VEHICLE IGNITION CIRCUIT BREAKER
Filed April 8, 1957  2 Sheets-Sheet 1
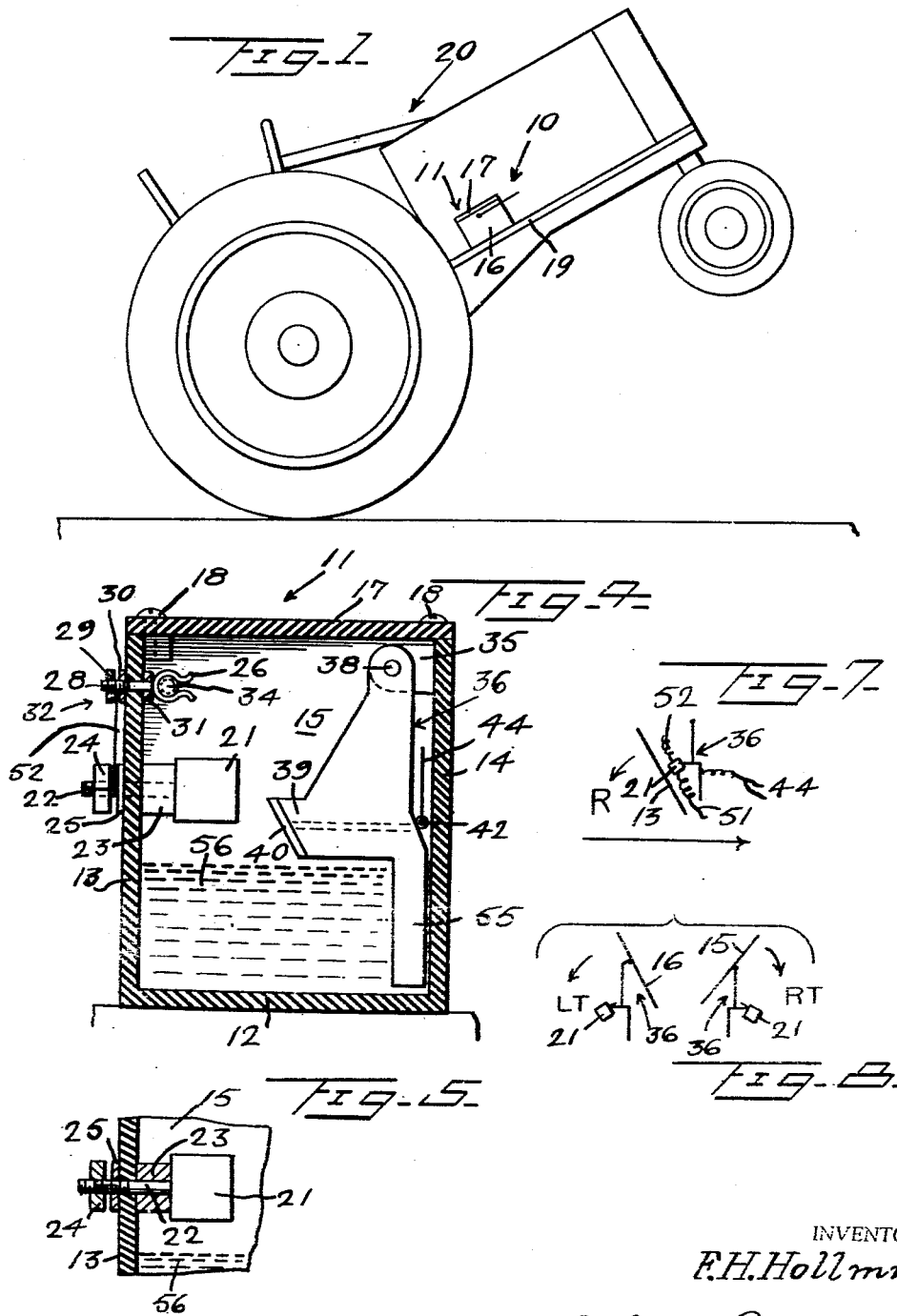
INVENTOR
F.H.Hollmig
BY John N. Randolph
ATTORNEY

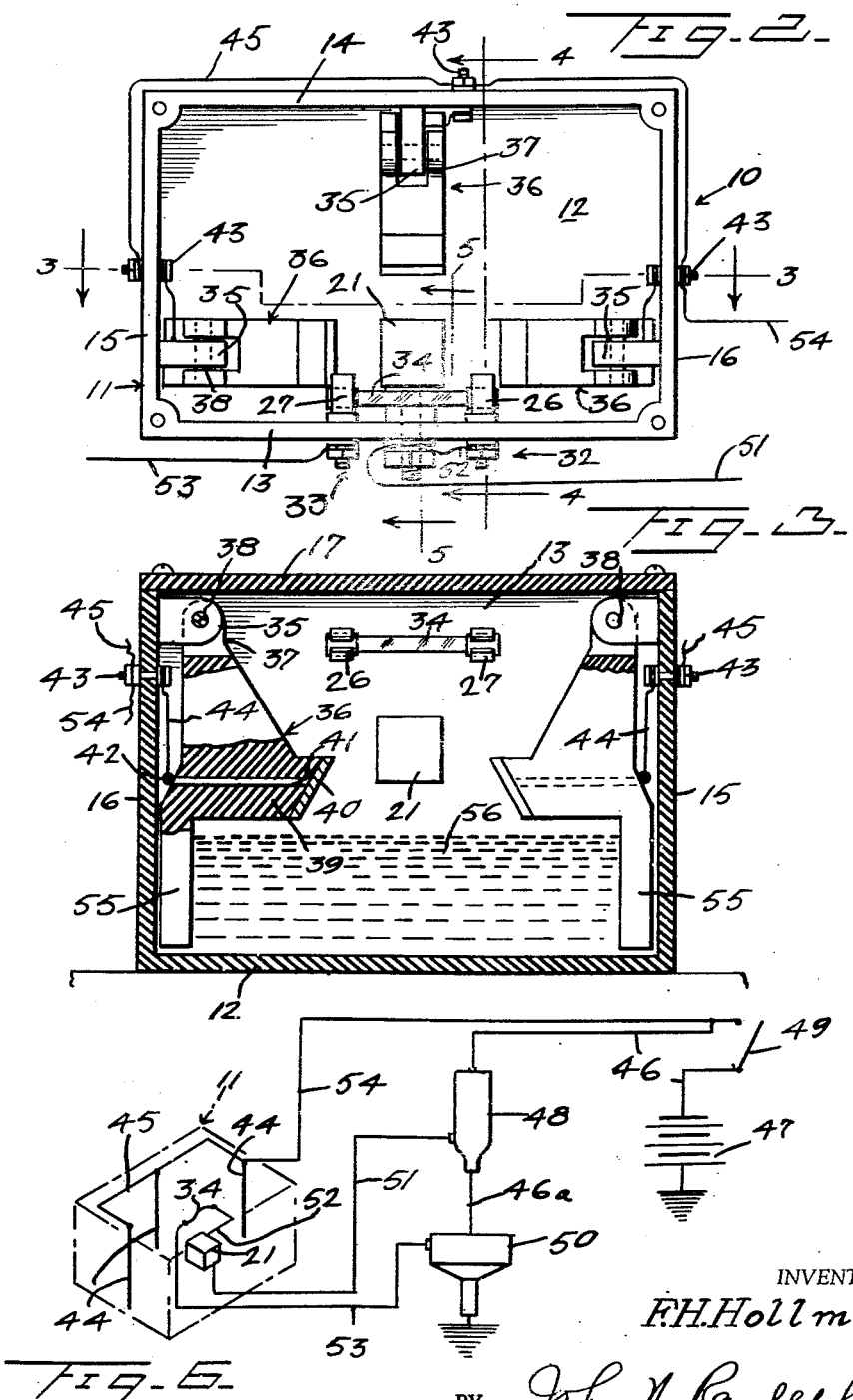

000# United States Patent Office 2,813,941
Patented Nov. 19, 1957

2,813,941

VEHICLE IGNITION CIRCUIT BREAKER

Felix H. Hollmig, Hondo, Tex.

Application April 8, 1957, Serial No. 651,397

3 Claims. (Cl. 200—61.52)

This invention relates to a circuit breaker attachment for motor vehicles and more particularly to such an attachment which is primarily adapted for use on tractors for breaking the ignition circuit before a tractor can assume a position tilted sufficiently so that there is risk of overturning of the tractor.

Many serious injuries and deaths have resulted to tractor operators due to a tractor overturning laterally while travelling across sloping terrain or rearing up and overturning rearwardly, where an implement drawn behind the tractor encounters an obstruction which interrupts forward motion of the tractor.

Accordingly, it is an object of the present invention to provide a safety device which will function automatically to break the ignition circuit of the prime mover of the tractor before the tractor can tilt to a dangerous degree in either manner to thus avoid the possibility of the tractor overturning and killing or injuring the operator.

A further object of the invention is to provide a safety attachment including a switch having multiple movable pendulum type switch elements normally disposed in a circuit interrupting position but one of which will assume a circuit closing position upon tilting of the tractor in either direction laterally or rearwardly.

A further object of the invention is to provide a safety attachment having means for dampening the movement of said pendulum elements to prevent movement thereof in response to normal vibration and jolting of a tractor, and which dampening means move automatically to a position to release the pendulum element upon tilting of the tractor in a direction to cause said pendulum element to assume a circuit closing position.

Various other objects and advantages of the invention will hereinafter become more fully apparent from the following description of the drawings, illustrating a presently preferred embodiment thereof, and wherein:

Figure 1 is a side elevational view of a tractor showing the circuit breaker mounted thereon and the tractor tilted to a position to cause the circuit breaker to automatically break the ignition circuit of the tractor;

Figure 2 is a top plan view of the circuit breaker, on an enlarged scale relative to Figure 1, and with the cover of the housing removed;

Figure 3 is a longitudinal vertical sectional view of the circuit breaker, taken substantially along a plane as indicated by the line 3—3 of Figure 2;

Figure 4 is a transverse vertical sectional view, taken substantially along a plane as indicated by the line 4—4 of Figure 2;

Figure 5 is a fragmentary vertical sectional view, taken substantially along a plane as indicated by the line 5—5 of Figure 2;

Figure 6 is a diagrammatic view of a part of an ignition circuit of an internal-combustion engine to which the ignition circuit breaker is connected;

Figure 7 is a diagrammatic view showing the position of certain of the parts of the circuit breaker to break the ignition circuit when the tractor rears up and tends to overturn backward, and Figure 8 is a diagrammatic view illustrating the position of certain of the circuit breaker parts for breaking the ignition circuit when the tractor tilts laterally to a dangerous degree.

Referring more specifically to the drawings, the vehicle ignition circuit breaker in its entirety is designated generally 10 and includes a housing, designated generally 11, formed of electrical insulating material including a bottom 12, a rear wall 13, a front wall 14, end walls 15 and 16 and a removable top wall or cover 17, which is secured to the corners of the front and rear walls and end walls by fastenings 18.

As illustrated in Figure 1, the bottom 12 of the housing 11 is adapted to be suitably secured immovably to a part 19 of a tractor 20, which part 19 is normally disposed in a horizontal position, so that the bottom 12 will normally be disposed in a horizontal plane. The housing 11 is secured to the tractor part 19 so that the longitudinal axis thereof will be disposed crosswise of the tractor, with the rear wall 13 facing to the rear of the tractor, the front wall 14 facing to the front of the tractor and the end walls 15 and 16 facing to the left side and right side, respectively, of the tractor.

A permanent magnet 21, which is preferably in the form of a square block, has a bolt or threaded rod 22 extending from one of the sides thereof and which projects outwardly through the rear wall 13. A spacing element 23, preferably formed of electrical insulating material, is mounted on the bolt 22 between the magnet 21 and the rear 13, for spacing said magnet from the rear wall. A nut 24 and a washer 25 are mounted on the bolt 22, on the outer side of the rear wall 13 and said parts combine with the bolt to form a contact post, the washer 25 being disposed between the wall 13 and nut 24. The magnet 21 is thus supported within the housing 11 below and spaced from the cover 17 and substantially above the level of the bottom 12.

Two spring clips 26 and 27 are disposed within the housing 11 above the magnet 21 and are supported by the rear wall 13. Bolts 28 are fixed to and extend from the spring clips 26 and 27 outwardly through the rear wall 13, and each bolt carries a nut 29 and a washer 30 on the outer side of the wall 13, and a spacing washer 31 between the spring clip and the inner side of the wall 13. The parts 28, 29 and 30 of the spring clip 26 form a contact post 32, and the corresponding parts of the spring clip 27 form a contact post 33, as best illustrated in Figure 2. A conventional fuse 34 is detachably supported in a conventional manner in the spring clips 26 and 27 and is electrically connected by said spring clips and the bolts 28 to the contact posts 32 and 33.

The end walls 15 and 16 and the front wall 14 are each provided with an apertured lug 35. The lugs 35 are fixed to and extend inwardly from said walls beneath and adjacent the cover 17 and are each disposed in alignment with the magnet 21, as seen in Figure 2. Each lug 35 swingably supports a pendulum member 36, each of which pendulum members has a bifurcated upper end 37 which straddles the outer portion of the lug 35 thereof. A pin 38 extends through each bifurcated pendulum portion 37 and through the lug 35 which is loosely disposed therein for swingably suspending the pendulums 36 from said lugs and with the pendulums disposed in alignment with the magnet 21. Each pendulum 36 has an inwardly extending intermediate portion 39 to the inner end of which is secured a plate 40 of electrical conducting material. The plates 40 are inclined downwardly and outwardly when the pendulums 36 are disposed in a normal position, as seen in Figures 3 and 4. A rod 41 of electrical conducting material extends through the intermediate portion 39 of each pendulum. The rods 41 are connected to the conductor plates 40 and have eyes 42 which project from portions of the outer edges of the pendulums 36.

A double binding post 43 is mounted in and extends through each of the walls 14, 15 and 16. Said binding posts 43 are disposed near the lugs 35. A conductor wire 44 is secured to and extends from the inner end of each post 43 to the eye 42 of the pendulum 36 which is supported by the same wall as said post 43. The three binding posts 43 are connected together electrically by a conductor wire 45 which is disposed externally of the housing 11 and which is connected to the outer portion of each binding post 43.

A portion of the ignition system of an internal-combustion engine such as is used on the tractor 20 is illustrated in Figure 6, including a conductor wire 46 which leads from a current source, such as the positive side of a storage battery 47, to the upper end of a conventional induction coil 48. An ignition switch 49 is interposed in the conductor 46 so that current from the battery 47 is supplied to the coil 48 only when the ignition switch 49 is in a circuit closing position. A conductor wire 46a leads from the lower end of the coil 48 to a top center connection of the distributor 50. In lieu of the conductor wire which normally connects the side of the coil 48 to the side of the distributor 50, a conductor wire 51 leads from the side of the coil 48 to the binding post 22, 24, 25 and a conductor wire 52 connects said binding post to the binding post 32. A conductor wire 53 leads from the binding post 33 to the side contact of the distributor 50 so that current is carried from the side of the coil 48 to the side of the distributor 50 through the fuse 34. A conductor wire 54 connects with the conductor wire 46, between the ignition switch 49 and the coil 48, and leads from said conductor wire 46 to the outer end of one of the binding posts 43, so that said conductor wire 54 and the conductor wire 45 connect the three binding posts 43 to the conductor 46, between the ignition switch 49 and coil 48. Thus, no current can be carried through the conductor wire 54 except when the ignition switch 49 is in a closed position and one of the contact plates 40 is in contact with the magnet 21.

The three pendulums 36 are provided with depending bottom portions 55 which extend downwardly from outer parts of the intermediate portions 39 and which are outwardly offset relative to the pendulum pivots 38 and extend to adjacent the housing bottom 12 and are normally disposed near and substantially parallel to the walls on which said pendulums are supported. The housing 11, except for the top thereof, is of liquid proof construction and is adapted to contain a liquid 56 up to a level somewhat beneath the intermediate portions 39 of the pendulums, as seen in Figure 3, and in which the bottom portions 55 of the pendulums are submerged to a substantial extent. The liquid 56, if desired, may constitute a non-conductor of electricity.

Assuming that the ignition switch is closed and that the tractor 20 is operating under substantially normal conditions with the tractor chassis in substantially a horizontal plane, the housing bottom 12 will be disposed substantially horizontal so that the three pendulums 36 will be disposed as seen in Figures 2, 3 and 4, relative to the magnet 21. Under such conditions, current will pass between the side of the coil 48 and the side of the distributor 50 through the conductor wires 51, 52 and 53 and through the fuse 34 which is of a proper capacity to carry this current. Thus, under such normal operating conditions the ignition circuit breaker 10 will not function. Should the tractor 20 commence to rear up and overturn backwards as illustrated in Figure 1, the housing 11 would then assume an inclined position as seen in Figure 1 and with the rear wall 13 thereof inclined as seen in Figures 1 and 7. The front wall 14 will be inclined to the same extent, and as the pendulum 36, which is mounted on said front wall would remain with its axis vertical, the plate 40 of said pendulum would assume a position in contact with the magnet 21, actually caused by swinging of the magnet 21 with the housing 11 relative to the pendulum 36 which is supported by the front wall 14. When electrical contact is made between the plate 40 and magnet 21, as illustrated diagrammatically in Figure 7, additional current will then flow from the conductor 46 through the conductor 54 and the conductor 45, through the binding post 43 which is supported in the front wall 14, through the conductor 44 which is connected to said binding post and through the rod 41, which is connected to said conductor 44, to said plate 40 and the magnet 21. From the magnet 21 the current will flow through the rod 22 and conductor 52 to the binding post 32 and thence through the fuse 34. The additional current thus passing through the fuse 34 will be sufficient to break the fuse and interrupt the flow of current to the side of the distributor 50. This will immediately break the ignition circuit of the engine of the tractor 20 to stop movement of the tractor before it could rear up sufficiently so that there was serious risk of the tractor overturning backwards. Before operation of the tractor can again be resumed, the broken fuse 34 must be replaced.

Figure 8 diagrammatically illustrates operation of the circuit breaker when the tractor 20 is tilted laterally to either the left or the right. Assuming that the tractor 20 tilts to the left, as it approaches a dangerous angle, the housing 11 will be laterally tilted so that the end wall 16 will assume an inclined position as seen in Figure 8 which will cause the conductor plate 40 of the pendulum 36 which is carried by said wall 16 to assume a position in electrical contact with the magnet 21. When this occurs, the fuse 34 will be broken in the same manner as previously described. In a like manner, if the tractor 20 tilts laterally in the opposite direction or to the right, the other end wall 15 will assume an inclined position as diagrammatically illustrated in Figure 8 and so that the plate 40 of the pendulum 36 carried by the wall 15 will be disposed in contact with the magnet 21 so that the fuse 34 will be broken, as heretofore described.

It will also be understood that the magnet 21 will insure a good contact of any one of the plates 40 therewith when such plate has assumed a position in sufficiently close proximity to the magnet to be attracted thereby, and the plate 40 will be maintained in contact with the magnet 21 until subsequently released forcibly therefrom, at the time that the fuse 34 is replaced. The liquid 56 functions as a dampening agent by resisting movement of the pendulum portions 55 within the housing 11, so that said pendulum portions 55 which act as paddles, will effectively prevent swinging of the pendulums 36 in the housing 11 due to vibration of the housing with the tractor or due to sudden turning, acceleration or deceleration of the tractor, so that there will be no possibility of one of the plates 40 inadvertently contacting the magnet 21. However, when the housing 11 is tilted either rearwardly or laterally, the liquid 56 will flow away from the paddle portion 55 of the pendulum 36, carrying the plate 40 which is likely to be contacted by the magnet 21, so that the liquid 56 will not interfere with swinging movement of said pendulum about the lug 35 on which it is supported.

Various modifications and changes are contemplated and may be resorted to, without departing from the function or scope of the invention as hereinafter defined by the appended claims.

I claim as my invention:

1. A vehicle ignition circuit breaker comprising a housing including a bottom, a rear wall, a front wall and end walls, said housing being adapted to be mounted on and secured to a part of a motor vehicle with the bottom thereof normally disposed in substantially a horizontal plane and with the rear wall facing the rear of the vehicle and the front wall facing toward the front of the vehicle, said front and rear walls being disposed substantially parallel to one another and at right angles to said end walls, a binding post extending through and secured in said rear wall, a fixed contact supported by said binding post on the inner side of said rear wall, a pair of fuse supporting clips having binding posts extending through and secured in said rear wall for mounting said clips on the inner side of the rear wall, a fuse detachably supported by said clips within the housing and in electrical contact with the binding posts of the clips, said fuse being adapted to be interposed in the ignition circuit of the vehicle between the coil and distributor, pendulum supporting elements fixed to and extending inwardly from said end walls and the front wall adjacent the top of the housing and disposed in alignment with said fixed contact, a pendulum swingably suspended from each of said pendulum supporting elements, electrical contact elements carried by said pendulum and disposed for movement into engagement with the fixed contact, an electric wire connecting the binding post of the fixed contact to the binding post of the fuse supporting clip through which current is carried to the fuse, an electrical conductor connected to each of said contact elements and adapted to be connected to the ignition circuit between the ignition switch and the induction coil thereof whereby when any one of said contact elements engages the fixed contact, additional current, sufficient to break the fuse, will pass through the fuse for breaking the ignition circuit, the pendulum supported by said front wall assuming a position to cause the contact element thereof to engage the fixed contact when the vehicle is inclined to a degree creating a risk of overturning rearwardly and one or the other of the contact elements of the pendulums associated with the end walls assuming a position in engagement with the fixed contact when the vehicle tilts laterally to a dangerous degree in either direction.

2. A vehicle ignition circuit breaker as in claim 1, said fixed contact comprising a permanent magnet for holding a contact element in engagement therewith by a magnetic attraction when the vehicle assumes an angle to cause the contact element to engage the fixed contact.

3. A vehicle ignition circuit breaker as in claim 2, said housing being formed of electrical insulating material and including a cover, a liquid filling the bottom portion of said housing to a level below the level of said fixed contact and contact elements, and said pendulums having bottom portions forming paddle members extending downwardly into the liquid and combining therewith to form a dampening means for dampening swinging movement of the pendulums relative to the housing except when the housing is tilted in a direction to cause the liquid to flow away from the paddle of a particular pendulum.

References Cited in the file of this patent
UNITED STATES PATENTS

| | | |
|---|---|---|
| 2,700,708 | Wall | Jan. 25, 1955 |
| 2,759,056 | Challman | Aug. 14, 1956 |